US010293296B2

(12) United States Patent
Ferguson et al.

(10) Patent No.: US 10,293,296 B2
(45) Date of Patent: May 21, 2019

(54) FILTER (75) Inventors: Robert H. Ferguson, Gastonia, NC (US); Jason L. Tate, Bessemer City, NC (US); Mark A. Roll, Bessemer City, NC (US); Roland V. Lanier, Jr., Belmont, NC (US); Mitchell J. Baker, Lincolnton, NC (US)

(73) Assignee: MANN+HUMMEL Filtration Technology Group Inc., Gastonia, NC (US)

( * ) Notice: Subject to any disclaimer, the term of this patent is extended or adjusted under 35 U.S.C. 154(b) by 1308 days.

(21) Appl. No.: 12/192,651

(22) Filed: Aug. 15, 2008

(65) Prior Publication Data
US 2010/0038305 A1   Feb. 18, 2010

(51) Int. Cl.
*B01D 29/07* (2006.01)
*B01D 29/21* (2006.01)
*B29C 70/84* (2006.01)
*B01D 46/52* (2006.01)

(52) U.S. Cl.
CPC ........ *B01D 46/528* (2013.01); *B01D 2271/02* (2013.01); *B01D 2271/025* (2013.01); *B01D 2271/027* (2013.01)

(58) Field of Classification Search
CPC .......... B01D 2271/02; B01D 2271/025; B01D 2271/027; B01D 46/528
USPC ...... 55/497; 210/455, 485, 495, 494.3, 93.1, 210/483, 497.01
See application file for complete search history.

(56) References Cited

U.S. PATENT DOCUMENTS

| 3,397,518 | A | * | 8/1968 | Rogers | 55/497 |
| 3,640,396 | A | * | 2/1972 | Brownell | 210/493.1 |
| 3,937,663 | A | * | 2/1976 | Bessiere | 210/493.1 |
| 4,065,341 | A | * | 12/1977 | Cub | 156/187 |
| 4,151,095 | A | * | 4/1979 | Wright | 210/443 |
| 4,419,108 | A | * | 12/1983 | Frost et al. | 95/286 |
| 4,865,637 | A | * | 9/1989 | Gruber | 96/136 |
| 4,886,533 | A | | 12/1989 | Sakashita et al. | |

(Continued)

FOREIGN PATENT DOCUMENTS

| CA | 997684 | 9/1976 |
| CA | 2642345 A1 | 8/2007 |

(Continued)

OTHER PUBLICATIONS

International Search Report dated Nov. 12, 2009 relating to International Application No. PCT/US2009/053749.

(Continued)

*Primary Examiner* — Bobby Ramdhanie
*Assistant Examiner* — Denise R. Anderson
(74) *Attorney, Agent, or Firm* — Honigman LLP (57) ABSTRACT A filter is disclosed. The filter includes a sheet of filter media defining a body having an upper portion, a lower portion, a first end surface proximate the upper portion, a second end surface proximate the lower portion, and a first side surface extending between the first and second end surfaces. One or more of the upper and lower portions define a ledge, wherein the ledge defines a third end surface arranged between the first and second end surfaces, and a second side surface extending between the first and third end surfaces; and a seal disposed upon the ledge. A method for manufacturing the seal is also disclosed.

37 Claims, 11 Drawing Sheets (56) References Cited

U.S. PATENT DOCUMENTS

| | | | |
|---|---|---|---|
| 4,925,561 A * | 5/1990 | Ishii et al. ................. | 210/493.3 |
| 5,143,575 A * | 9/1992 | Glassel et al. ............. | 156/309.9 |
| 5,902,365 A * | 5/1999 | Haggard ...................... | 55/498 |
| 6,190,432 B1 * | 2/2001 | Gieseke ............. | B01D 46/0001 |
| | | | 123/198 E |
| 6,358,290 B1 * | 3/2002 | Huttlin .......................... | 55/283 |
| 6,776,814 B2 * | 8/2004 | Badeau et al. ............... | 55/385.3 |
| 2003/0182911 A1 | 10/2003 | Schrage | |

FOREIGN PATENT DOCUMENTS

| | | |
|---|---|---|
| CA | 2670487 A1 | 12/2009 |
| DE | 4421024 | 10/1995 |
| EP | 1134015 | 9/2001 |
| GB | 2094652 A | 9/1982 |
| WO | WO-2005063361 A1 | 7/2005 |
| WO | WO-2006049694 | 5/2006 |

OTHER PUBLICATIONS

Office Action dated Feb. 14, 2012, from the Canadian Intellectual Property Office relating to Application No. 2,734,255.

Office Action dated Sep. 19, 2014, from the Canadian Intellectual Property Office relating to Application No. 2,820,610.

Canadian Office Action for the related application No. 2,820,610 dated Jun. 10, 2016.

Canadian Office Action for the related application No. 2,820,610 dated May 27, 2015.

* cited by examiner

FILTER

FIELD

The invention relates to filters.

BACKGROUND

Various filters are known in the art for filtering fluid as it passes through a fluid path. Filters include, in part, filter media which removes impurities from a fluid, such as, for example, oil or fuel that passes through filter media.

In most applications, either the filter or the filter media associated therewith must be periodically replaced to reduce the potential of developing unacceptably high impedance in the fluid path flow restriction.

While known filters have proven to be acceptable for various applications, such conventional filters are nevertheless susceptible to improvements that may enhance their overall performance and cost. Therefore, a need exists to develop improved filters that advance the art.

BRIEF DESCRIPTION OF THE DRAWINGS

The present disclosure will now be described, by way of example, with reference to the accompanying drawings, in which.

DETAILED DESCRIPTION

The Figures illustrate exemplary embodiments of a filter in accordance with embodiments of the invention and based on the foregoing, it is to be generally understood that the nomenclature used herein is simply for convenience and the terms used to describe the invention should be given the broadest meaning by one of ordinary skill in the art.

Figure 1:
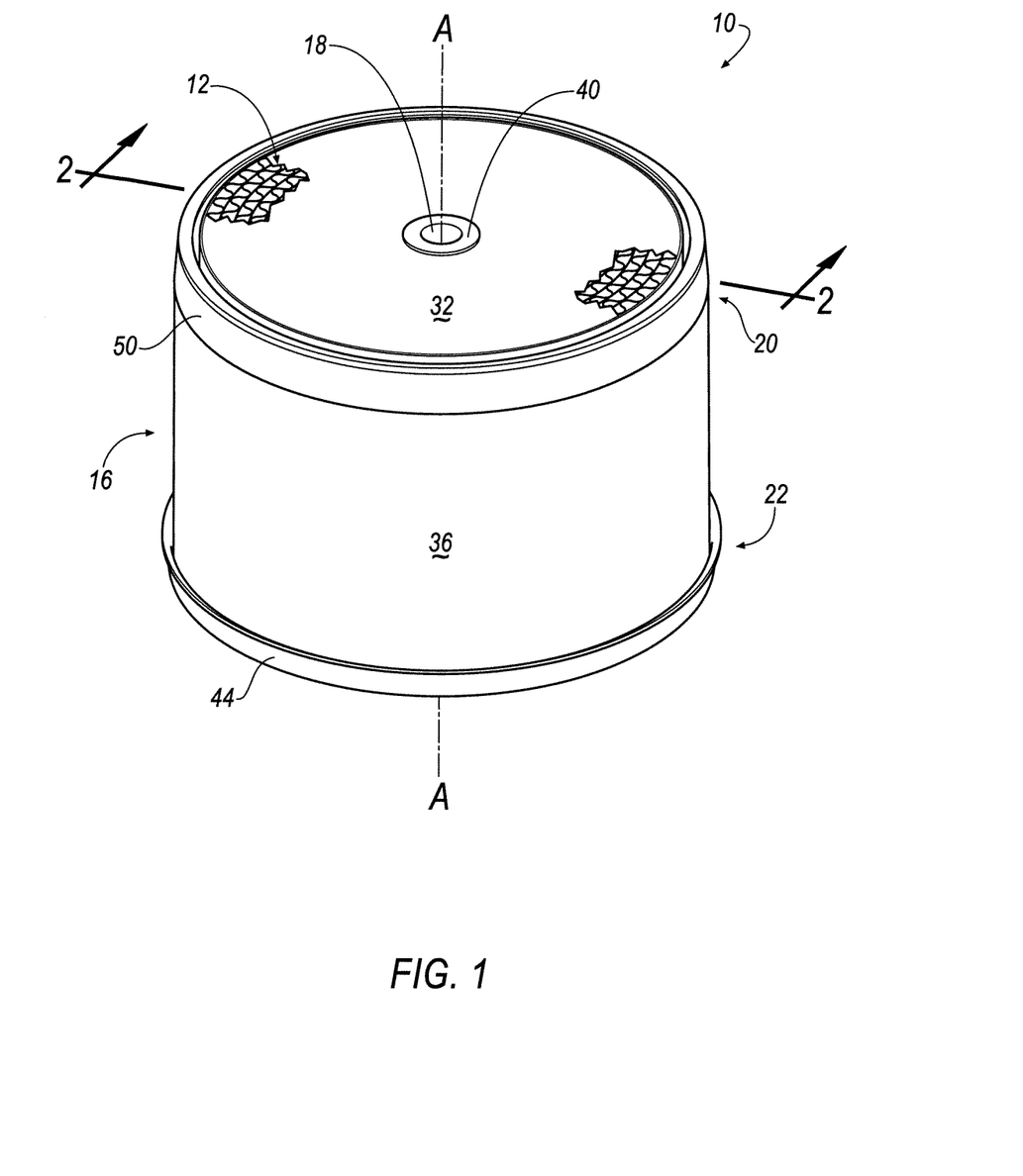
FIG. 1 is a perspective view of a filter in accordance with an exemplary embodiment of the invention.
Figure 2:
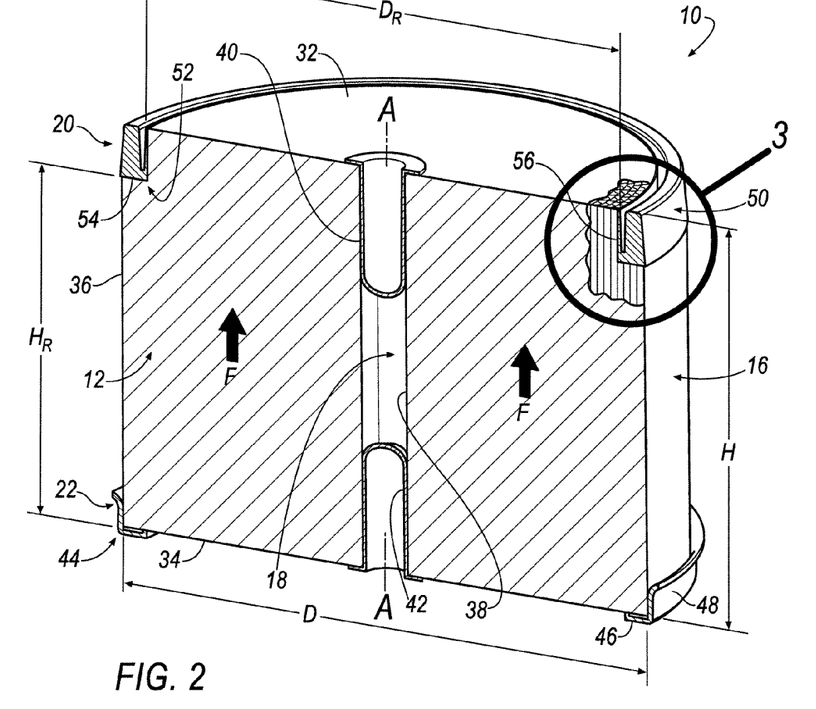
FIG. 2 is a cross-sectional view of the filter of FIG. 1 according to line 2-2.

Referring to FIG. 1-2, a filter 10 is shown according to an exemplary embodiment of the invention. In an embodiment, the filter 10 generally comprises a cylindrical shape. It will be appreciated, however, that the filter 10 is not limited to include any particular shape or design and that the filter 10 may include any desirable shape or design.

Figure 4:
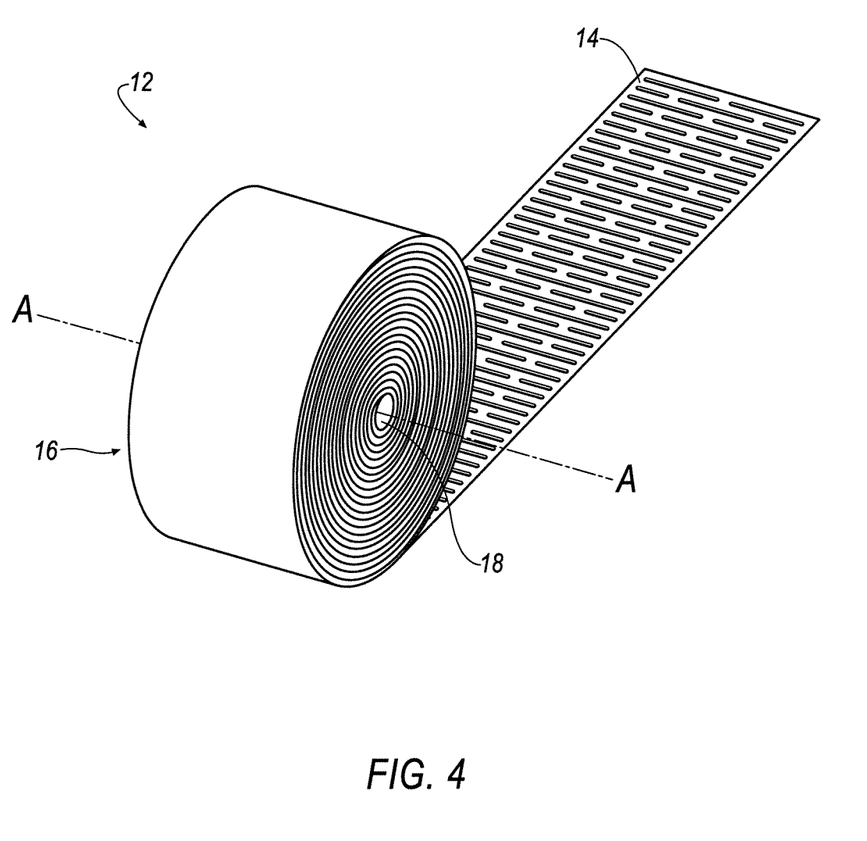
FIG. 4 is a perspective view of a sheet of filter media being prepared into a substantially cylindrical body accordance with an exemplary embodiment of the invention.

The filter 10 is generally defined to include filter media, which is shown generally at 12. In an embodiment, as seen in FIG. 4, the filter media 12 includes a sheet 14 of filter material that is rolled or wrapped to generally define a substantially cylindrical body 16. The substantially cylindrical body 16 generally defines an axial passage 18. In an embodiment, the sheet 14 is rolled or wrapped about a central axis, A-A, that is shown extending through the axial passage 18.

Referring to FIG. 2, the substantially cylindrical body 16 defines an upper portion 20 and a lower portion 22. In an embodiment, the substantially cylindrical body 16 is defined by a height, H, and a diameter, D.

Figure 5A:
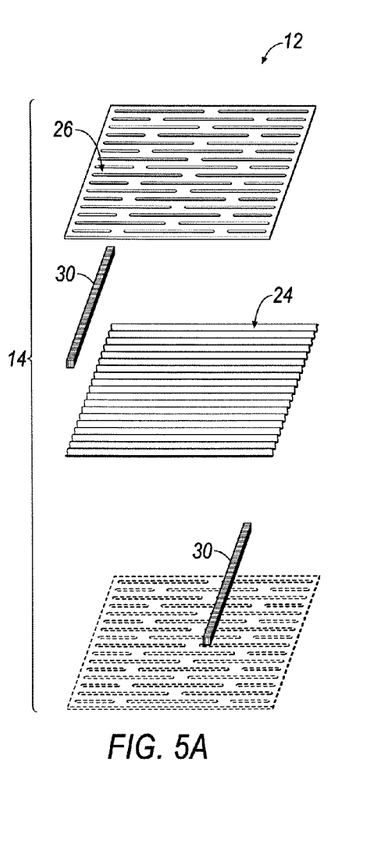
FIGS. 5A-5C illustrate perspective views of a sheet of filter media that may be formed into a substantially cylindrical body in accordance with an exemplary embodiment of the invention.
Figure 5B:
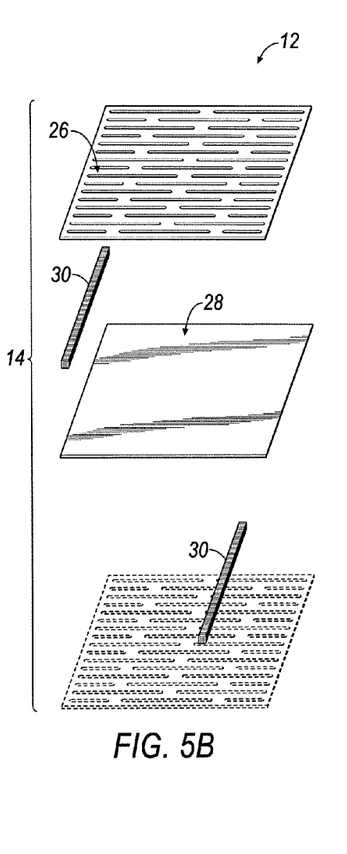
Figure 5C:
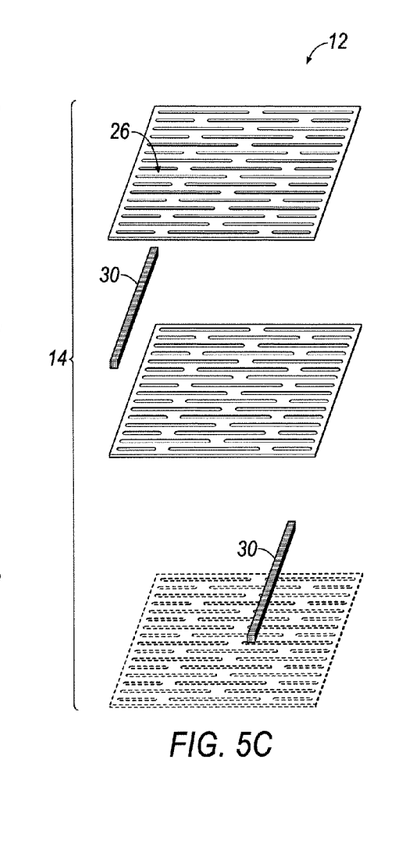

It will be appreciated that the sheet 14 of filter media 12 may be defined by any desirable number of layers, patterns, configurations or the like. For example, in an embodiment, as seen in FIGS. 5A-5C, the sheet 14 of filter media 12 may include one or more layers or the like defined by, for example, corrugations 24, embossments 26, a substantially flat, planar surface 28, or the like. In an embodiment, the sheet 14 of filter media 12 may also include one or more end beads 30.

Referring to FIG. 2, the filter media 12 further defines a first axial end surface 32 proximate the upper portion 20 and a second axial end surface 34 proximate the lower portion 22. In an embodiment, the first axial end surface 32 is arranged opposite the second axial end surface 34.

In an embodiment, the filter media 12 further defines an outer circumferential side surface 36 and an inner circumferential side surface 38. In an embodiment, the inner circumferential side surface 38 defines the axial passage 18.

In an embodiment the filter 10 includes a first core plug 40 disposed adjacent the first axial end surface 32 and extending axially into the axial passage 18. In an embodiment, the filter 10 includes a second core plug 42 disposed adjacent the second axial end surface 34 and extending axially into the axial passage 18. In an embodiment, the first and second core plugs 40, 42 may include any desirable plastic material, such as, for example, Nylon In an embodiment, the filter 10 includes a ring 44. In an embodiment, the ring 44 includes a radial portion 46 and an axial portion 48. In an embodiment, the radial portion 46 is disposed substantially adjacent the second axial end surface 34, and the axial portion 48 is disposed substantially adjacent the outer circumferential side surface 36. In an embodiment, the ring 44 may include any desirable material such as, for example, metallic or plastic.

In an embodiment, fluid may flow through the filter 10 according to the direction of the arrow, F. In reference to the direction of the arrow, F, the second axial end surface 34 may generally define an upstream, "dirty side" of the filter 10 that receives unfiltered, "dirty" fluid whereas the first axial end surface 32 may generally define a downstream, "clean side" of the filter 10 that provides filtered, "clean" fluid. However, it will be appreciated that the filter 10 is not limited to the above-described fluid flow according to the direction of the arrow, F, and, if desired, the first axial end surface 32 may define the upstream, "dirty side" of the filter 10, and, the second axial end surface 34 may define the downstream, "clean side" of the filter 10.

In an embodiment, if, for example, the first axial end surface 32 is the downstream, "clean side" of the filter 10, a seal 50 may be disposed at least proximate the upper portion 20 of the substantially cylindrical body 16. When the filter 10 is disposed inside of a filter housing (not shown), the seal 50 is located substantially adjacent the filter housing and proximate a passage (not shown) formed in the filter housing. Functionally, the seal 50 prevents potentially unfiltered, "dirty fluid" from escaping the filter housing through the filter housing passage. Accordingly, the seal 50 prevents the mixing of "dirty fluid" with the "clean fluid" such that the filtered, "clean fluid" may leave the filter housing through the filter housing passage by way of the fluid moving through the filter 10 according to the direction of the arrow, F.

In an embodiment, the seal 50 is disposed upon a stepped ledge 52 of the substantially cylindrical body 16. In an embodiment, the stepped ledge 52 is formed proximate the upper portion 20 of the substantially cylindrical body 16.

Although the ledge 52 is described as a "stepped" ledge, it will be appreciated that the ledge 52 is not limited to define a "step" or any particular shape or dimension. Functionally, the ledge 52 provides a location on the substantially cylindrical body 16 for receiving the seal 50. Accordingly, for example, the ledge 52 may include any desirable size or shape that may permit reception of the seal 50 such as, for example, an arcuate shape, a concave shape, a convex shape, a frustoconical shape, a constant slope, an irregular slope, or the like.

In an embodiment, the stepped ledge 52 generally defines the substantially cylindrical body 16 to have a reduction of its height, H, and a reduction of its diameter, D, which is shown generally at $H_R$ and $D_R$, respectively, in FIG. 2. In an embodiment, the stepped ledge 52 further defines the substantially cylindrical body 16 to include a third axial end surface 54 and a second outer circumferential side surface 56. The third axial end surface 54 and the second outer circumferential side surface 56 are both proximate the upper portion 20 of the substantially cylindrical body 16.

As illustrated, the third axial end surface 54 is arranged between the first and second axial end surfaces 32, 34. Further, the second circumferential side surface 56 extends between the first and third axial end surfaces 32, 54.

Figure 6:
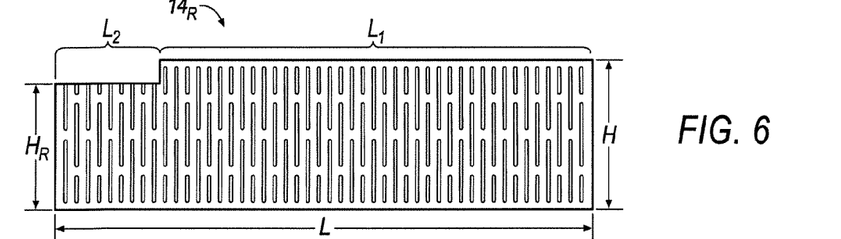
FIG. 6 is a top view of a pre-formed sheet of filter media in accordance with an exemplary embodiment of the invention.

The stepped ledge 52 may be formed or provided in any desirable fashion. For example, in an embodiment, as seen in FIG. 6, a sheet of filter material $14_R$ may be pre-formed in any desirable configuration prior to being rolled or wrapped upon itself to define the substantially cylindrical body 16. For example, the pre-formed sheet $14_R$ may be defined to have a length, L, including a first length portion, $L_1$, and a second length portion, $L_2$. In an embodiment, the first length portion, $L_1$, defines the height, H, and the second length portion, $L_2$, defines the reduced height, $H_R$.

In reference to FIG. 6, the sheet of filter material $14_R$ is wrapped upon itself from right to left to define the substantially cylindrical body 16. Accordingly, when wrapped upon itself, the first length portion, $L_1$, generally defines the reduced diameter, $D_R$, having the height, H, and, the second length portion, $L_2$, generally defines the diameter, D, having the reduced height, $H_R$.

Figure 7:
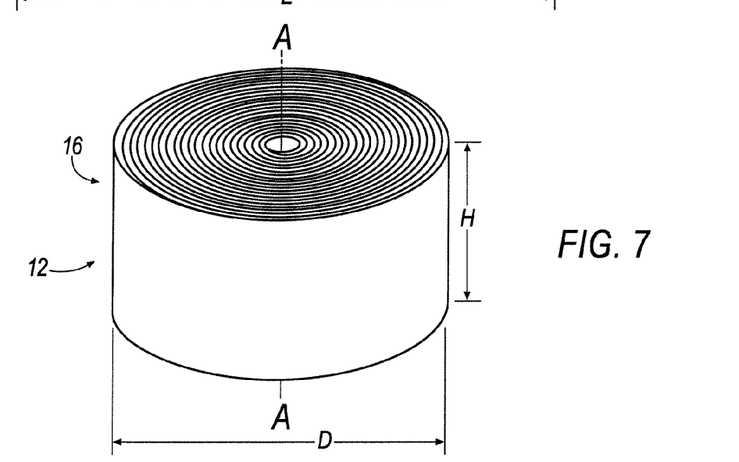
FIG. 7 is a perspective view of a substantially cylindrical body of filter media in accordance with an exemplary embodiment of the invention.
Figure 8:
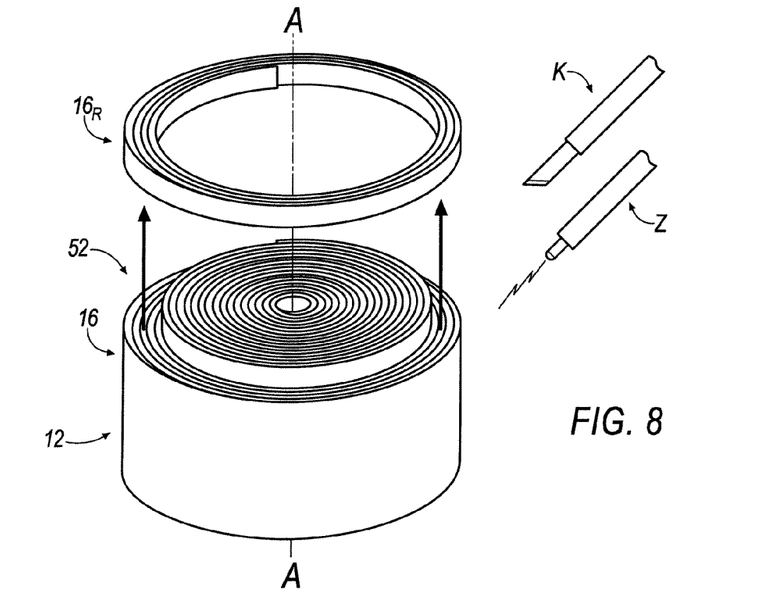
FIG. 8 is a perspective view of the substantially cylindrical body of filter media of FIG. 7 that is modified in a precision cutting operation.

In an embodiment, the stepped ledge 52 may be formed without providing a pre-formed sheet $14_R$ as described above. For example, as seen in FIG. 7, in an embodiment, the sheet 14 may include a length having similar height, H, and, upon rolling or wrapping the sheet 14 about the axis, A-A, upon itself to define the substantially cylindrical body 16, the substantially cylindrical body 16 defines the diameter, D. Then, as seen in FIG. 8, a precision cutting operation, for example, may be performed on the substantially cylindrical body 16 in order to remove a portion $16_R$ of the substantially cylindrical body 16. As illustrated, the removed portion $16_R$ generally defines a ring of the substantially cylindrical body 16 that is removed proximate, for example, the upper portion 20 of the substantially cylindrical body 16. Accordingly, upon eliminating the ring $16_R$ from the substantially cylindrical body 16, the stepped ledge 52 is formed to permit later depositing of the seal 50 upon the ledge 52. In an embodiment, a knife, K, laser, Z, or the like may be utilized to remove the ring $16_R$ from the substantially cylindrical body 16.

Figure 9A:
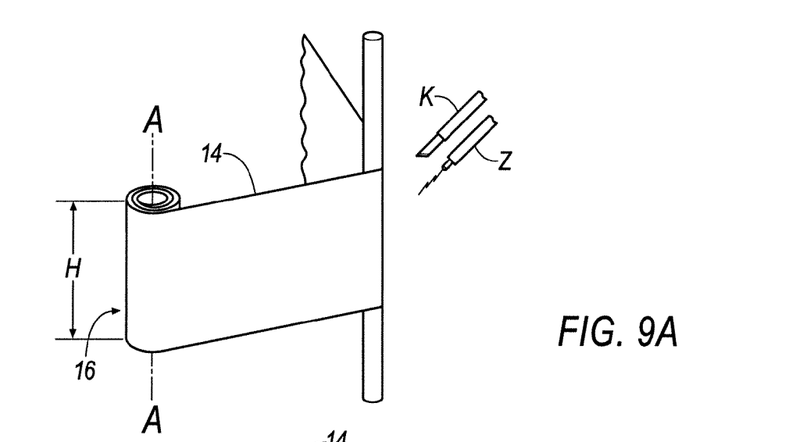
FIGS. 9A-9C are perspective views of a filter being manufactured in accordance with an exemplary embodiment of the invention.
Figure 9B:
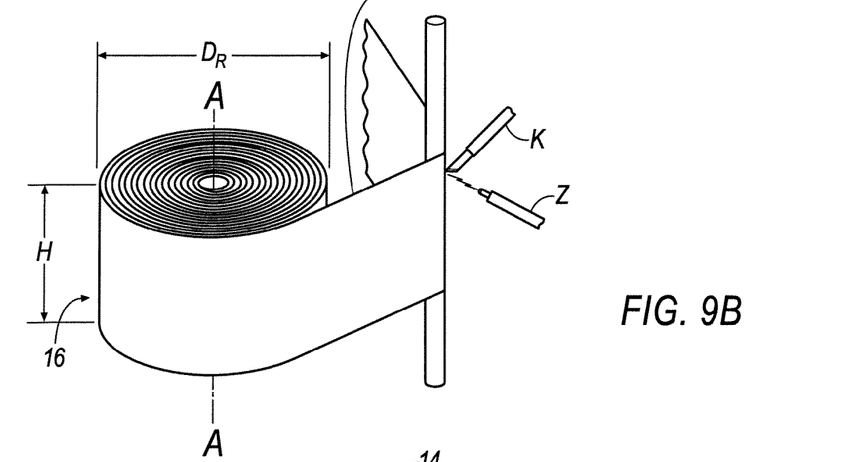
Figure 9C:
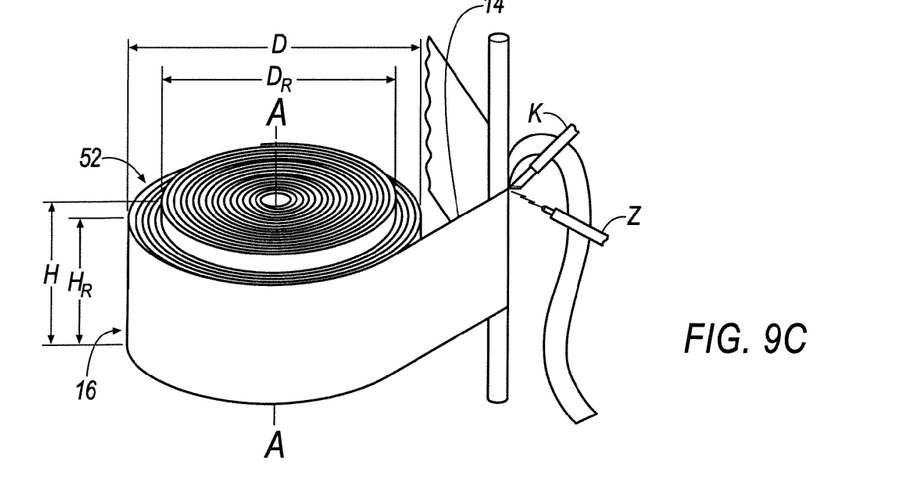

In another embodiment, as seen in FIGS. 9A-9C, the precision cutting operation may be conducted in an operation that involves the simultaneous wrapping of the sheet 14 upon itself while a portion of the sheet 14 is removed. For example, as seen in FIG. 9A, the formation of the substantially cylindrical body 16 may be initiated by obtaining an end of the sheet 14 and wrapping the sheet 14 about the axis, A-A, upon itself. Then, as seen in FIGS. 9B and 9C, once it has been determined that the sheet 14 has been wrapped about the axis, A-A, to provide the substantially cylindrical body 16 with the reduced diameter, $D_R$ (see, e.g., FIG. 9B), the knife, K, or laser, Z, may be actuated to remove a portion of the height, H, of the sheet 14 as the wrapping of the sheet 14 about the axis, A-A, is continued. Once it has been determined that the diameter, D (see, e.g., FIG. 9C), of the substantially cylindrical body 16 has been achieved, the wrapping of the sheet 14 about the axis, A-A is ceased.

In order to accomplish the above-identified steps that includes the step of actuating, as seen in FIG. 9B, the knife, K, or laser, Z, during the wrapping of the sheet 14 about the axis, A-A, a sensor and/or processor may be included to provide the stepped ledge 52 in an automated process. For example, a sensor may monitor the wrapping of the sheet 14 upon itself, and, upon wrapping the sheet 14 to define the reduced diameter, $D_R$, the sensor may communicate with the processor such that the processor may actuate the knife, K, or laser, Z. Although a sensor and processor are described above, it will be appreciated that the process is not limited to include a sensor and/or processor and that any desirable type and number of components may be included to communicate in any desirable manner to provide the substantially cylindrical body 16 with the stepped ledge 52.

Figure 3:
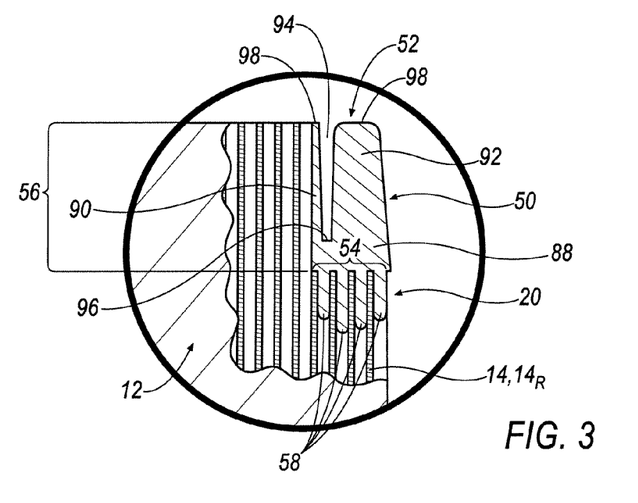
FIG. 3 is an enlarged view of the filter according to line 3 of FIG. 2.

In an embodiment, as seen in FIG. 3, the third axial end surface 54 of the stepped ledge 52 is generally defined by the outer three-to-five wraps of the sheet 14, $14_R$ about the axis, A-A. Although the illustrated embodiment of FIG. 3 shows the third axial end surface 54 being defined by three-to-five wraps of the sheet 14, $14_R$, it will be appreciated that the third axial end surface 54 may be defined by any desirable number of wraps of the sheet 14, $14_R$.

Once the stepped ledge 52 has been formed, the seal 50 may be deposited on the stepped ledge 52 in any desirable manner. In an embodiment, substantially cylindrical body 16 may be disposed in a mold tool and the seal 50 may be molded over the stepped ledge 52 in an injection molding operation. In an embodiment, as seen in FIG. 3, during the molding operation, the material defining the seal 50 may be permitted to flow between the three-to-five wraps of the sheet 14, 14$_R$ in order to define fingers 58 extending from the seal 50 that extend substantially axially into the substantially cylindrical body 16 to create a mechanical bond of the seal 50 with the substantially cylindrical body 16.

In an embodiment, upon molding the seal 50 over the stepped ledge 52, the seal becomes integral with and adheres to the substantially cylindrical body 16. In an embodiment, the seal may not be integral with the substantially cylindrical body or adhered thereto. By molding the seal 50 in the manner described above, the seal 50 may be provided with the substantially cylindrical body 16 without providing additional components/structure to clip, fasten or retain the seal 50 to the substantially cylindrical body 16. In an embodiment, the seal 50 may include a polyurethane material.

Figure 10:
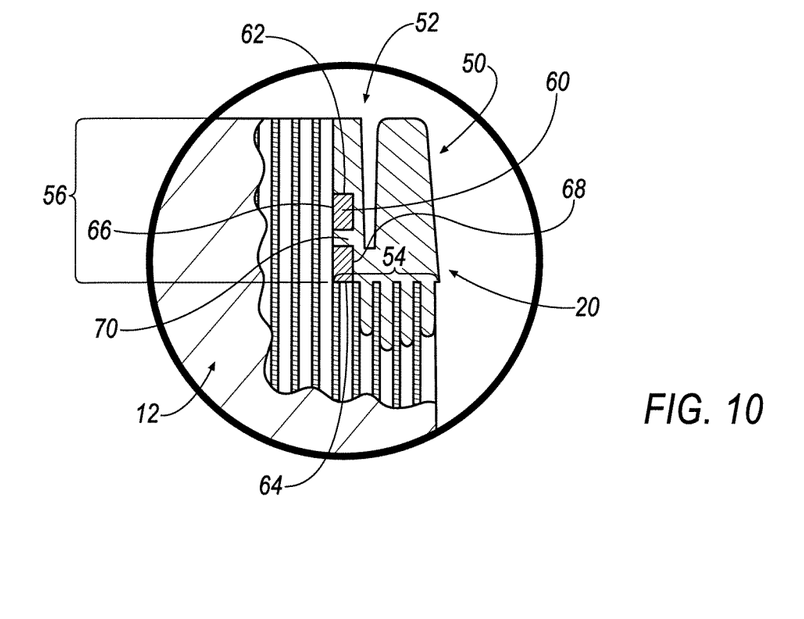
FIG. 10 is an enlarged view of a filter in accordance with an exemplary embodiment of the invention.
Figure 11:
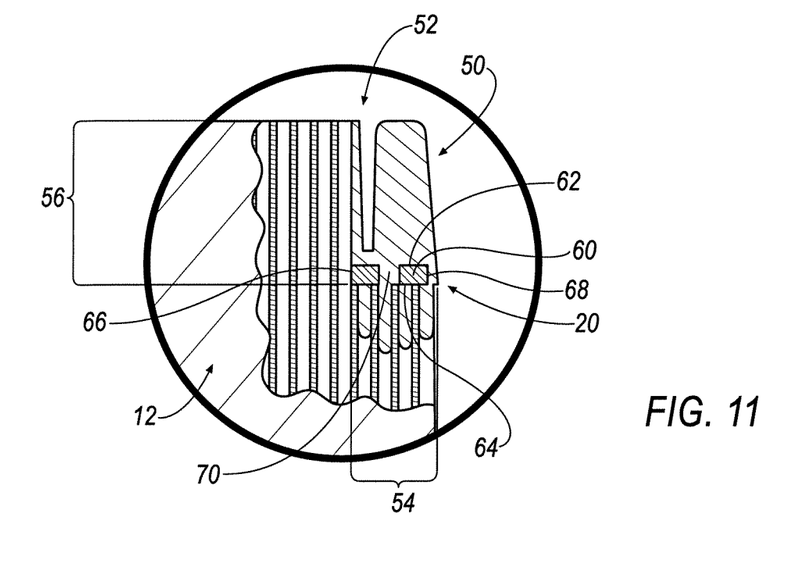
FIG. 11 is an enlarged view of a filter in accordance with an exemplary embodiment of the invention.

In an embodiment, as seen in FIGS. 10 and 11, prior to molding the seal 50 upon the stepped ledge 52, a retaining ring 60 may be disposed adjacent the stepped ledge 52 such that, upon molding the seal 50 over the stepped ledge 52, the retaining ring 60 becomes encapsulated between the substantially cylindrical body 16 and the seal 50. Functionally, the retaining ring 60 increases the rigidity to the upper portion 20 of the substantially cylindrical body 16.

In an embodiment, the rigidifying ring 60 includes an upper surface 62, a lower surface 64, an inner surface 66 and an outer surface 68. In an embodiment, the rigidifying ring 60 may include one or more passages 70. In an embodiment, as seen in FIG. 10, the one or more passages 70 extend through the rigidifying ring 60, from the inner surface 66 to the outer surface 68. In an embodiment, as seen in FIG. 11, the one or more passages 70 extend through the rigidifying ring 60, from the upper surface 62 to the lower surface 64. In an embodiment, the one or more passages 70 permits the material of the seal 50 to flow therethrough in order to increase the mechanical bond of the rigidifying ring 60 and the seal 50.

In an embodiment, as seen in FIGS. 10 and 11, the inner surface 66 is disposed adjacent the second outer circumferential side surface 56 and the lower surface 64 is disposed adjacent the third axial end surface 54. As seen in FIG. 10, the inner surface 66 includes a greater dimension than that of the lower surface 64; conversely, as seen in FIG. 11, the lower surface 64 includes a greater dimension than that of the inner surface 66. In an embodiment, the rigidifying ring 60 may include any desirable material, such as, for example plastic or metallic.

Figure 12:
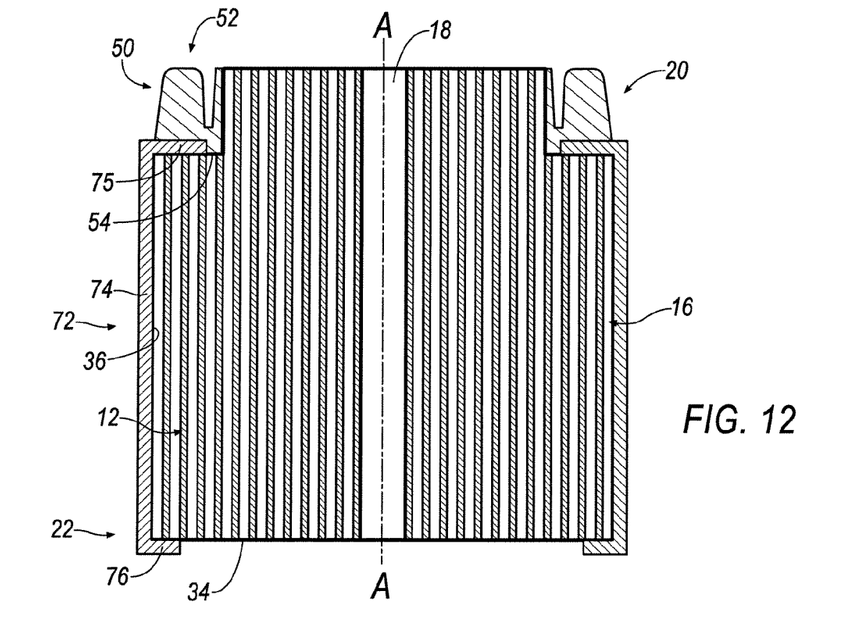
FIG. 12 is a cross-sectional view of a filter in accordance with an exemplary embodiment of the invention.

Referring to FIG. 12, in an embodiment, a shell 72 may be disposed adjacent the substantially cylindrical body 16 prior to molding the seal 50 over the stepped ledge 52. In an embodiment, the shell 72 includes an axial portion 74 disposed substantially adjacent the outer circumferential side surface 36, a first radial portion 75 extending radially inwardly toward the central axis, A-A, and disposed substantially adjacent the third axial end surface 54, and a second radial portion 76 extending radially inwardly toward the central axis, A-A, and disposed substantially adjacent the second axial end surface 34. As similarly described above, the seal 50 is disposed over the stepped ledge 52, and, as a result, encapsulates the first radial portion 75 between the seal 50 and the substantially cylindrical body 16. In an embodiment, the shell 72 may include any desirable plastic material, such as, for example nylon.

Figure 13:
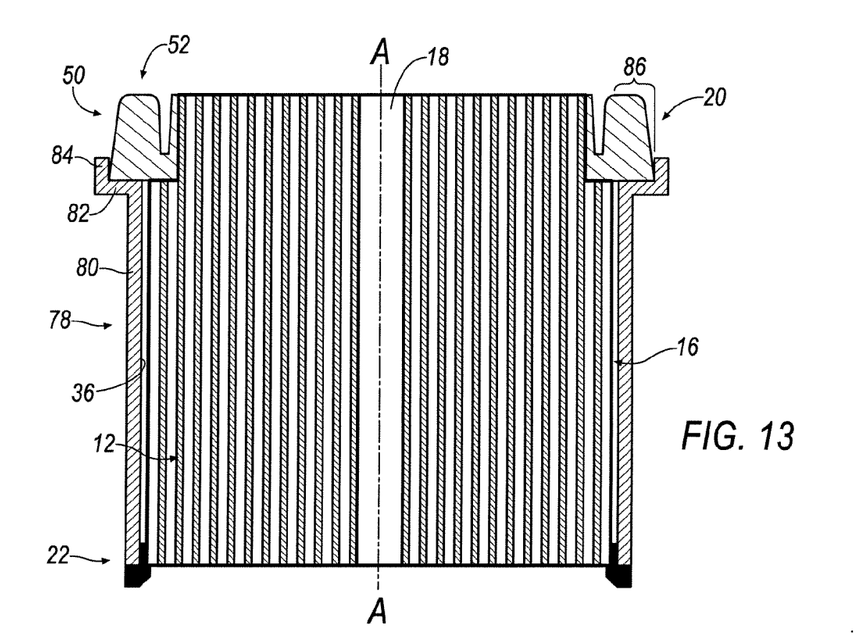
FIG. 13 is a cross-sectional view of a filter in accordance with an exemplary embodiment of the invention.

Referring to FIG. 13, in an embodiment, a shell 78 may be disposed adjacent the substantially cylindrical body 16 prior to molding the seal 50 over the stepped ledge 52. In an embodiment, the shell 78 includes a first axial portion 80 disposed substantially adjacent the outer circumferential side surface 36, a radial portion 82 extending radially outwardly away from the central axis, A-A, and a second axial portion 84 extending axially away from the radial portion 82. The first axial portion 80 of the shell 78 may be adhered, for example, proximate the lower portion 22 of the substantially cylindrical body 16 with, for example, an adhesive.

Functionally, the shell 78 is not encapsulated by the seal 50 as described in the embodiments discussed above. The seal 50, as associated with the shell 78, however, is formed on the stepped ledge 52 in a substantially cantilevered manner such that the seal 50 extends radially outwardly away from the central axis, A-A, and past the outer circumferential side surface 36 of the substantially cylindrical body 16. Accordingly, the radial portion 82 and the second axial portion 84 function by substantially retaining and/or supporting a portion 86 of the seal 50 that extends radially outwardly and past the outer circumferential side surface 36. In an embodiment, the shell 78 may include any desirable plastic material, such as, for example nylon.

Referring to FIG. 3, the shape and associated function of the seal 50 is described. The seal 50 generally includes a radial base portion 88 disposed substantially adjacent the third axial end surface 54. The seal 50 generally includes a first axial portion 90 disposed substantially adjacent the second outer circumferential side surface 56. The seal 50 generally includes a second axial portion 92. The first and second axial portions 90, 92 extend axially away from the radial base portion 88.

Figure 17:
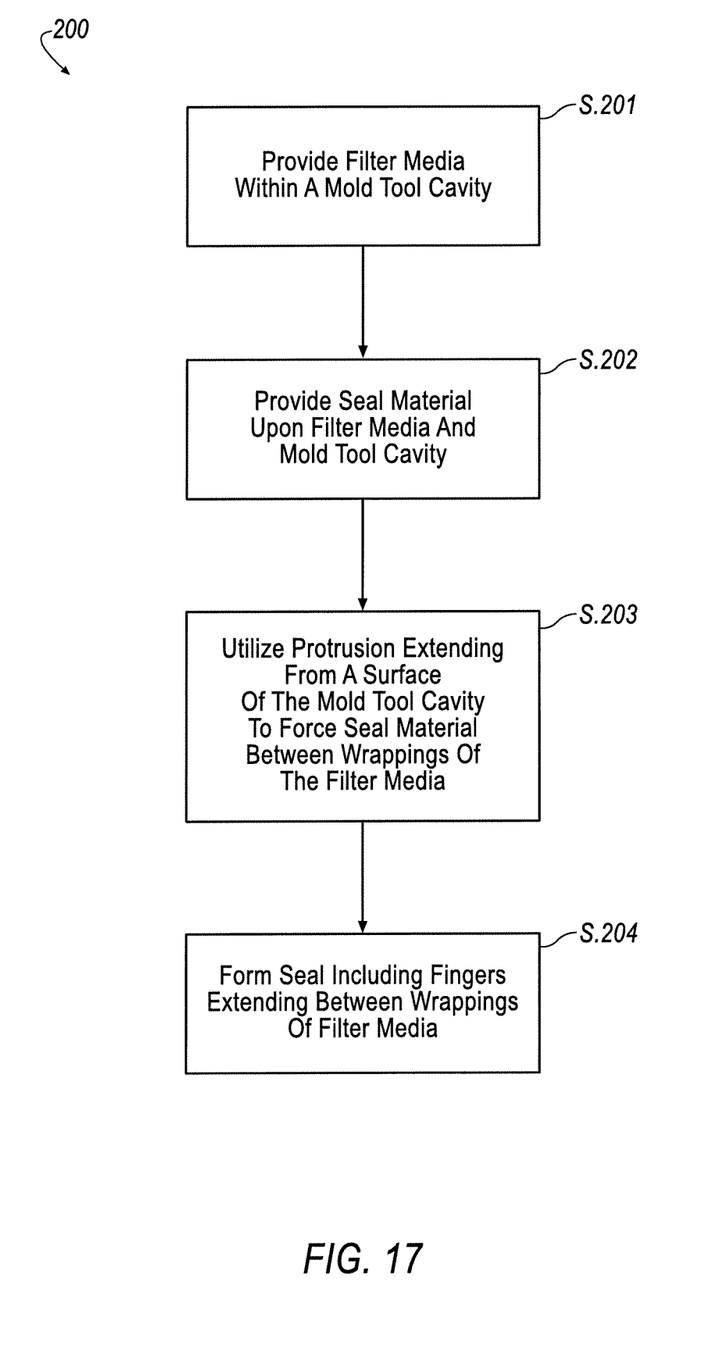
FIG. 17 is a method for manufacturing a filter in accordance with an exemplary embodiment of the invention.

The first and second axial portions 90, 92 generally define a recess 94 that terminates at a valley 96 defined by the radial base portion 88. Referring to FIG. 17, in an embodiment, the recess 94 is created in a method 200 by providing, S.201, the filter media 12 into a mold tool cavity, which includes a protrusion extending from a surface of the mold cavity that corresponds to the shape/contour of the recess 94. Functionally, the protrusion extending from the surface of the mold cavity acts as a dam, S.203, during a molding procedure that results in material (e.g., polyurethane) provided/injected, S.202, into the mold tool cavity to be directed between the wraps of the sheet 14 in order to form the seal 50 with the fingers 58, S.204.

Further, after removing the filter 10 from the mold tool, the resulting recess 94 formed by the protrusion of the mold tool may permit insertion and receipt of a substantially circumferential lip (not shown) of the filter housing within the seal 50. In an embodiment, the lip may define the passage formed in the filter housing that receives the filtered, "clean fluid." Further, in an embodiment, the recess 94 may be filled with any desirable material, such as, for example, a caulking material, to increase the strength of the seal 50. The first and second axial portions 90, 92 also include peaks 98 that are to be located adjacent the filter housing and proximate the filter housing passage.

Figure 14:
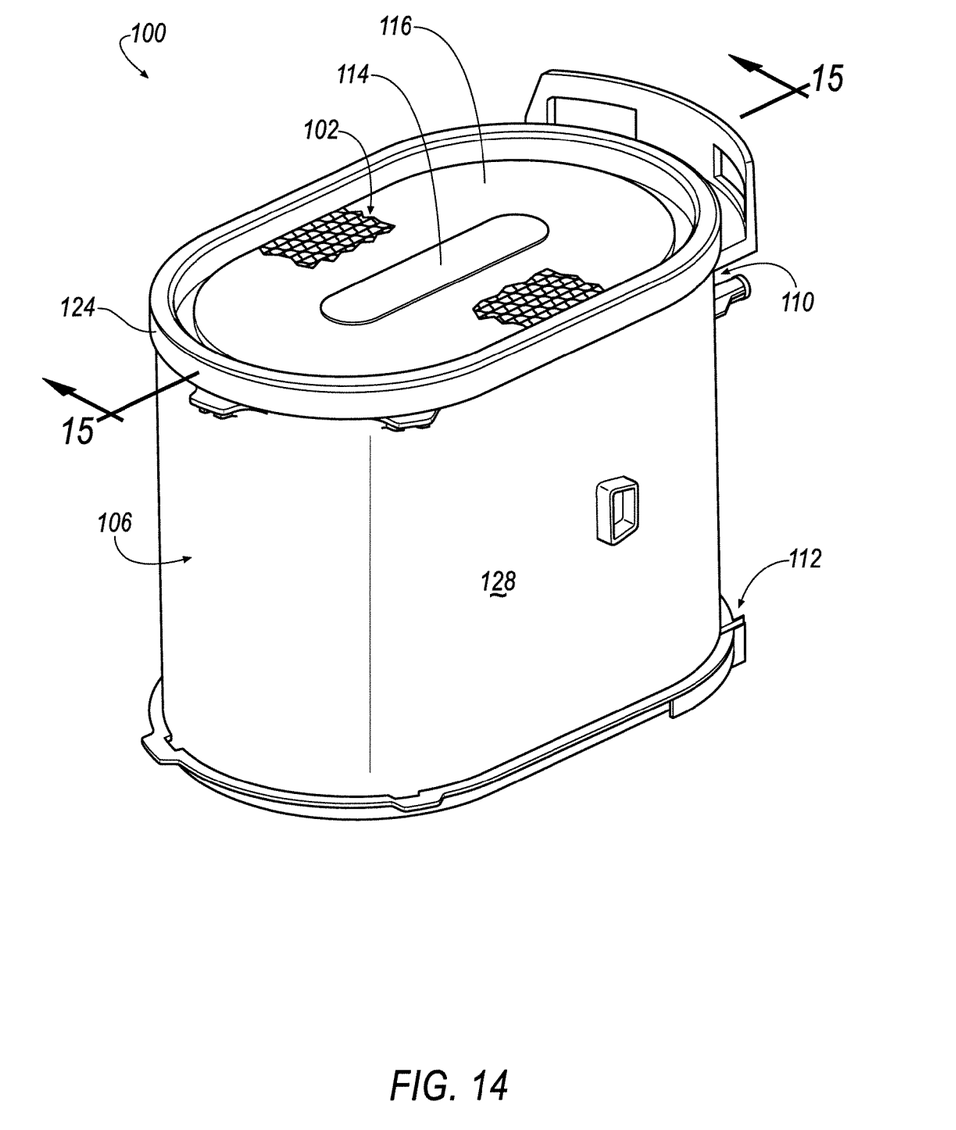
FIG. 14 is a perspective view of a filter in accordance with an exemplary embodiment of the invention.
Figure 15:
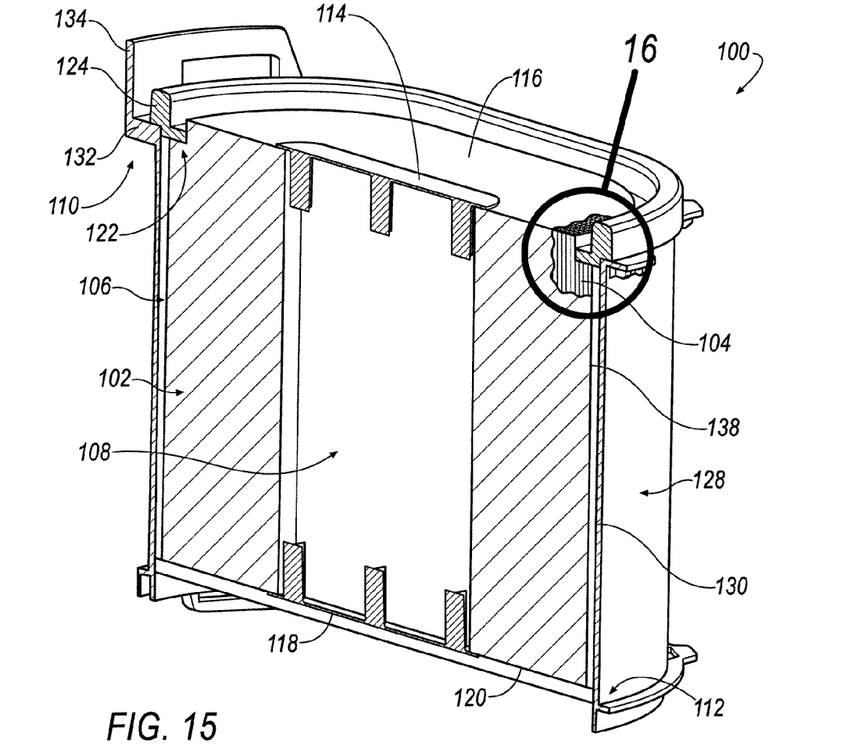
FIG. 15 is a cross-sectional view of the filter of FIG. 15 according to line 15-15.
Figure 16:
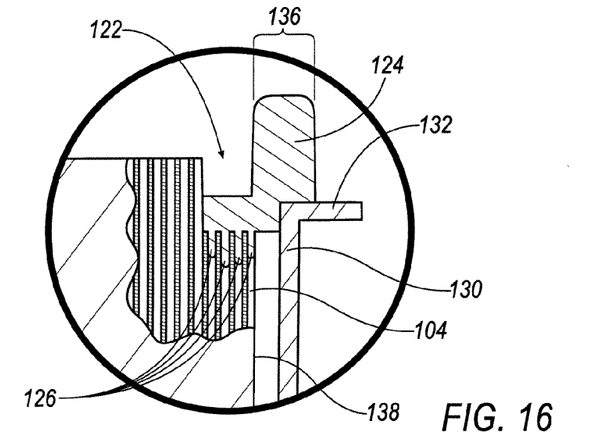
FIG. 16 is an enlarged view of the filter according to line 16 of FIG. 15.

Referring to FIGS. 14-16, a filter 100 is shown according to an exemplary embodiment of the invention. In an embodiment, the filter 100 generally comprises an oval shape. It will be appreciated, however, that the filter 100 is not limited to include any particular shape or design and that the filter 100 may include any desirable shape or design.

The filter 100 is generally defined to include filter media, which is shown generally at 102. In an embodiment, filter media 102 is substantially similar to the filter media 12 as shown and described above in FIG. 4 with the exception that the filter media 102 includes a sheet 104 that is wrapped to define a substantially oval body 106 rather than a substantially cylindrical body. In an embodiment, the substantially oval body 106 generally defines an axial passage 108. In an embodiment, the sheet 104 may be wrapped upon itself to form a substantially oval body 106 that does not form the passage 108. Further, in an embodiment, the passage 108 may be sealed with any desirable material, such as, for example, a hot melt glue and a core plug may be omitted. In an embodiment, the passage 108 may be sealed as described above and core plugs may additionally be included. In an embodiment, the substantially oval body 106 defines an upper portion 110 and a lower portion 112.

In an embodiment the filter 100 includes a first core plug 114 disposed adjacent a first axial end surface 116 and extending axially into the axial passage 108. In an embodiment, the filter 100 includes a second core plug 118 disposed adjacent a second axial end surface 120 and extending axially into the axial passage 108. In an embodiment, the first and second core plugs 114, 118 may include any desirable plastic material, such as, for example, nylon.

In an embodiment, the substantially oval body 106 includes a stepped ledge 122 that is formed proximate the upper portion 110 in a manner similarly described above in FIGS. 6-9C. In an embodiment, a seal 124 is deposited upon the stepped ledge 122 in a manner similarly described above, such as, for example, a molding operation. As similarly described above, the material of the seal 124 may flow between the three-to-five outer wraps of the substantially oval body 106 to define fingers 126.

In an embodiment, the seal 124 is disposed upon the stepped ledge 122 in a cantilevered manner as similarly shown and described in FIG. 13. In an embodiment, the filter 100 includes a shell 128 as similarly described above in FIG. 13 having a first axial portion 130, a radial portion 132 extending from the axial portion 130 and a second axial portion 134 extending axially away from the radial portion 132. One or more of the radial portion 132 and the second axial portion 134 function by substantially retaining and/or supporting a portion 136 of the seal 124 that extends radially outwardly and past the outer circumferential side surface 138.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A filter, comprising:
a sheet of filter media defining a body having an upper portion, a lower portion, a first end surface proximate the upper portion, a second end surface proximate the lower portion, a first side surface extending between the first and second end surfaces, wherein one or more of the upper and lower portions define a ledge, wherein the ledge defines a third end surface of the body between the first and second end surfaces, and a second side surface of the body extending between the first and third end surfaces; and
a seal disposed upon the ledge, wherein the sheet of filter media is wrapped about itself to define the body having a plurality of sheet wrappings and a plurality of flutes having openings formed in the first end surface, the second end surface and the third end surface, wherein material defining the seal extends between the plurality of sheet wrappings to define a plurality of fingers, and wherein the plurality of fingers substantially close-off the openings of the plurality of the flutes of the third end surface.

2. The filter according to claim 1, wherein the seal includes a base portion disposed substantially adjacent the third end surface, a first portion extending from the base portion, wherein the first portion is disposed substantially adjacent the second side surface, and a second portion extending from the base portion, wherein the first and second portions define a recess that terminates at a valley defined by the base portion, wherein the first and second portions define peaks.

3. The filter according to claim 2, wherein the plurality of fingers extend in a first direction from the base portion, and the first and second portions extend in a second direction from the base portion, the second direction being opposite the first direction.

4. The filter according to claim 1, wherein the sheet of filter media defines an axial passage extending between the first end surface and the second end surface, wherein a central axis extends through the axial passage.

5. The filter according to claim 4, wherein the first, second and third end surfaces are axial end surfaces, wherein the first and second side surfaces are circumferential side surfaces.

6. The filter according to claim 5, wherein the body is a substantially cylindrical body.

7. The filter according to claim 5, wherein the body is a substantially oval body.

8. The filter according to claim 1, wherein the sheet of filter media includes one or more layers defined by corrugations, embossments and a substantially flat, planar surface.

9. The filter according to claim 1 further comprising
a retaining ring disposed adjacent the ledge, wherein the retaining ring is encapsulated between the seal and the body.

10. The filter according to claim 1 further comprising
a plastic shell disposed adjacent the body.

11. The filter according to claim 10, wherein a portion of the plastic shell is disposed adjacent the ledge, wherein the portion of the shell is encapsulated between the seal and the body.

12. The filter according to claim 10, wherein a portion of the seal is cantilevered relative the body, wherein a portion of the plastic shell supports the portion of the seal that is cantilevered relative the body.

13. The filter according to claim 1, wherein the third end surface extends from the first side surface to the second side surface and defines a step relative to the first end surface.

14. The filter according to claim 1, wherein openings of the flutes in the third end surface include a first opening and a second opening, the second opening disposed radially outward of the first opening.

15. A filter, comprising:
filter media defining a body having an upper portion, a lower portion, a first axial end surface proximate the upper portion, a second axial end surface proximate the lower portion, an axial passage extending between the first and second axial end surfaces, wherein a central axis extends through the axial passage, wherein one or more of the upper and lower portions define a stepped ledge that defines a third axial end surface arranged between the first and second axial end surfaces, and a second circumferential side surface extending between the first and third axial end surfaces; and a seal disposed upon the stepped ledge, wherein the filter media includes flutes that extend from the third axial end surface to the second axial end surface, the flutes including openings formed in the third axial end surface, and wherein material of the seal defines a plurality of fingers that substantially close-off the openings of the flutes of the third end surface.

16. The filter according to claim 15, wherein the seal includes a radial base portion disposed substantially adjacent the third axial end surface, a first axial portion extending axially from the radial base portion, wherein the first axial portion is disposed substantially adjacent the second circumferential side surface, and a second axial portion extending axially from the radial base portion, wherein the first and second axial portions define a recess that terminates at a valley defined by the radial base portion, wherein the first and second axial portions define peaks.

17. The filter according to claim 16, wherein the plurality of fingers extend in a first direction from the radial base portion, and the first and second axial portions extend in a second direction from the radial base portion, the second direction being opposite the first direction.

18. The filter according to claim 15, wherein the filter media is a sheet that includes one or more layers defined by corrugations, embossments and a substantially flat, planar surface.

19. The filter according to claim 15, wherein the openings of the flutes of the third end surface include a first opening and a second opening, the second opening disposed radially outward of the first opening.

20. A filter comprising:
a body of filter media having a first end and a second end, wherein a plurality of flutes extend between the first end and the second end, the plurality of flutes defining openings about the first end, wherein the first end includes a recessed ledge about a periphery of the first end such that some of the plurality of flutes extend between the recessed ledge and the second end and some of the openings defined by the plurality of flutes are formed in the recessed ledge; and a seal disposed about the recessed ledge, wherein the seal includes fingers that at least partially extend into and substantially close-off the openings defined by the plurality of flutes at the recessed ledge.

21. The filter according to claim 20, wherein the openings defined by the plurality of flutes at the recessed ledge include a first opening and a second opening, the second opening disposed radially outward of the first opening.

22. The filter according to claim 20, wherein the seal includes a radial base portion disposed substantially adjacent the recessed ledge, a first axial portion extending axially from the radial base portion, and a second axial portion extending axially from the radial base portion, wherein the first and second axial portions define a recess that terminates at a valley defined by the radial base portion, wherein the fingers extend in a first direction from the radial base portion, and the first and second axial portions extend in a second direction from the radial base portion, the second direction being opposite the first direction.

23. A method for manufacturing the filter of claim 1, comprising the steps of:

wrapping the sheet of filter media upon itself to define the body;
forming the body to include the ledge; and
disposing the seal upon the ledge.

24. The method according to claim 23 further comprising the step of
prior to the wrapping step, pre-forming the sheet of filter media to include a first length portion having a first height, and a second length portion having a second height that is less than the first height, wherein upon wrapping the sheet of filter media upon itself, the first length portion defines the body to have a first diameter, and the second length portion defines the body to have a second diameter, wherein the second diameter is greater than the first diameter.

25. The method according to claim 23, wherein the wrapping step includes the step of
defining the body to include an upper portion, a lower portion and a first diameter, wherein the forming step includes the step of
removing a portion of the body proximate one or more of the upper and lower portions to define one or more of the upper and lower portions to include a second diameter that is less than the first diameter.

26. The method according to claim 23, wherein wrapping step includes the step of
defining the body to include a first diameter, wherein the forming step includes the step of
simultaneously wrapping the sheet upon itself while removing a portion of the sheet for defining the body to include a second diameter, wherein the second diameter is greater than the first diameter.

27. A method for manufacturing the filter of claim 1, comprising the steps of:
providing a within a mold tool cavity the sheet of filter media wrapped about itself to define the body having a plurality of sheet wrappings;
defining the mold tool cavity to include a surface having a protrusion extending from the surface;
providing the material defining the seal upon the third end surface of the body and the surface of the mold tool cavity to form the seal upon the the third end surface of the body; and
utilizing the protrusion extending from the surface of the mold tool cavity as a dam for forcing the injected material defining the seal between some of the plurality of sheet wrappings of the body to define the plurality of fingers extending from the seal.

28. A method for manufacturing the filter of claim 15, comprising the steps of:
wrapping a sheet of the filter media upon itself to define the body;
forming the body to include the stepped ledge; and
disposing the seal upon the stepped ledge.

29. The method according to claim 28, further comprising the step of:
prior to the wrapping step, pre-forming the sheet of the filter media to include a first length portion having a first height, and a second length portion having a second height that is less than the first height, wherein, upon wrapping the sheet of the filter media upon itself, the first length portion defines the body to have a first diameter, and the second length portion defines the body to have a second diameter, wherein the second diameter is greater than the first diameter.

30. The method according to claim 28, wherein the wrapping step includes the step of:

defining the body to include an upper portion, a lower portion and a first diameter, and wherein the forming step includes the step of removing a portion of the body proximate one or more of the upper and lower portions to define one or more of the upper and lower portions to include a second diameter that is less than the first diameter.

31. The method according to claim 28, wherein the wrapping step includes the step of:

defining the body to include a first diameter, wherein the forming step includes the step of simultaneously wrapping the sheet of the filter media upon itself while removing a portion of the sheet of the filter media for defining the body to include a second diameter, wherein the second diameter is greater than the first diameter.

32. A method for manufacturing the filter of claim 15, comprising the steps of:

providing within a mold tool cavity, a sheet of the filter media wrapped about itself a plurality of times to define the body having a plurality of sheet wrappings;

defining the mold tool cavity to include a surface having a protrusion extending from the surface;

providing the material of the seal upon the third axial end surface of the body and the surface of the mold tool cavity to form the seal upon the third axial end surface of the body; and utilizing the protrusion extending from the surface of the mold tool cavity as a dam for forcing the injected material of the seal between some of the plurality of sheet wrappings of the body to define the plurality of fingers extending from the seal.

33. A method for manufacturing the filter of claim 20, comprising the steps of:

wrapping a sheet of filter media upon itself to define the body of filter media;

forming the body of filter media to include the recessed ledge; and disposing a seal upon the recessed ledge.

34. The method according to claim 33 further comprising the step of:

prior to the wrapping step, pre-forming the sheet of filter media to include a first length portion having a first height, and a second length portion having a second height that is less than the first height, wherein, upon wrapping the sheet of filter media upon itself, the first length portion defines the body of filter media to have a first diameter, and the second length portion defines the body of filter media to have a second diameter, wherein the second diameter is greater than the first diameter.

35. The method according to claim 33, wherein the wrapping step includes the step of:

defining the body of filter media to include an upper portion, a lower portion and a first diameter, and wherein the forming step includes the step of removing a portion of the body of filter media proximate one or more of the upper and lower portions to define one or more of the upper and lower portions to include a second diameter that is less than the first diameter.

36. The method according to claim 33, wherein wrapping step includes the step of:

defining the body of filter media to include a first diameter, and wherein the forming step includes the step of simultaneously wrapping the sheet of filter media upon itself while removing a portion of the sheet of filter media for defining the body of filter media to include a second diameter, wherein the second diameter is greater than the first diameter.

37. A method for manufacturing the filter of claim 20, comprising the steps of:

providing a body of filter media within a mold tool cavity, wherein the body of filter media is defined by a wrapped sheet of material comprising a plurality of wrappings;

defining the mold tool cavity to include a surface having a protrusion extending from the surface;

providing a seal material upon the recessed ledge of the body of filter media and the surface of the mold tool cavity to form a seal upon the recessed ledge of the body of filter media; and utilizing the protrusion extending from the surface of the mold tool cavity as a dam for forcing the injected seal material between some of the plurality of wrappings of the body of filter media to define fingers extending from the seal.

* * * * *